United States Patent
Nagaraj

(10) Patent No.: US 8,196,026 B2
(45) Date of Patent: Jun. 5, 2012

(54) METHOD AND COMPUTER UNIT FOR ERROR DETECTION AND LOGGING IN A MEMORY

(75) Inventor: Narayana Nagaraj, Bangalore Karnataka (IN)

(73) Assignee: Robert Bosch GmbH, Stuttgart (DE)

( * ) Notice: Subject to any disclaimer, the term of this patent is extended or adjusted under 35 U.S.C. 154(b) by 967 days.

(21) Appl. No.: 11/887,664

(22) PCT Filed: Apr. 12, 2006

(86) PCT No.: PCT/EP2006/061539
§ 371 (c)(1),
(2), (4) Date: May 13, 2008

(87) PCT Pub. No.: WO2006/108849
PCT Pub. Date: Oct. 19, 2006

(65) Prior Publication Data
US 2009/0055718 A1    Feb. 26, 2009

(30) Foreign Application Priority Data
Apr. 12, 2005   (DE) .......................... 10 2005 016 801

(51) Int. Cl.
*G06F 11/10*    (2006.01)
*H03M 13/00*   (2006.01)

(52) U.S. Cl. .......................... 714/807; 714/722; 714/699
(58) Field of Classification Search .......... 714/697–699, 714/722, 807
See application file for complete search history.

(56) References Cited

U.S. PATENT DOCUMENTS

| | | | | | |
|---|---|---|---|---|---|
| 3,567,916 | A | * | 3/1971 | Fulton, Jr. | 377/28 |
| 4,698,808 | A | * | 10/1987 | Ishii | 714/722 |
| 4,727,544 | A | * | 2/1988 | Brunner et al. | 463/29 |
| 4,930,129 | A | | 5/1990 | Takahira et al. | |
| 6,959,391 | B1 | * | 10/2005 | Baldischweiler | 726/34 |
| 7,409,623 | B2 | * | 8/2008 | Baker et al. | 714/763 |
| 2005/0120146 | A1 | * | 6/2005 | Chen et al. | 710/22 |

FOREIGN PATENT DOCUMENTS

| | | |
|---|---|---|
| DE | 101 13 317 | 9/2002 |
| GB | 2 016 758 | 9/1979 |

* cited by examiner

*Primary Examiner* — Sam Rizk
(74) *Attorney, Agent, or Firm* — Kenyon & Kenyon LLP

(57) ABSTRACT

In a method for detecting errors in computer data in a memory, a check sum is calculated in runtime and compared to a stored check sum. In this method, the computer data is being subdivided into at least two logical blocks and a check sum is calculated for each logical block. Also provided is a computer unit having a processor and a memory which has a ROM in which firmware is stored, and/or which has a RAM, the memory having at least two logging functions for logging established memory errors, e.g., errors in the ROM and/or the RAM.

11 Claims, 3 Drawing Sheets

METHOD AND COMPUTER UNIT FOR ERROR DETECTION AND LOGGING IN A MEMORY

BACKGROUND OF THE INVENTION

1. Field of the Invention

The present invention relates to a method for error detection, a method for error logging in a memory, corresponding central processing units, a computer program as well as a computer program product.

2. Description of Related Art

Reference is made below to embedded systems in motor vehicles, as examples, without the present invention's being restricted to this application.

Embedded systems resemble usual computer systems in their design, and are made up of hardware and software. The software on such a system is called firmware, and is usually located in a ROM (read only memory), which is developed, for example, as a flash ROM. Besides that, an embedded system also has RAM (random access memory), which contains dynamic data and is typically executed as static RAM.

RAM is a memory whose content is available for use only as long as it is supplied with operating voltage. During the operation of an embedded systems, RAM is written on and read out as often as necessary. In the RAM, typically dynamic data and system values are stored, such as speed, acceleration, revolution numbers, sensor values, etc. To improve processing speed, a part of the program code that is to be executed may also, for example, be copied from the ROM into the RAM, and be executed there. Firmware, however, is usually executed directly from the ROM.

ROM is a durable memory that can be written on, which is only read out during the normal operating phase. Depending on the physical construction of the ROM, it can be written on once or several times. The memory content remains present, even without energy supply. The executable program code (firmware), and also constant data and parameters lie in the ROM of an embedded system.

Like most computer memories, RAM and ROM are made up of transistors and capacitors. Memory losses or memory errors are able to occur during operation. As causes, let us just cite, for example, radiation, electric loading and discharge, construction faults, etc.

Even just a single defective memory cell is able to cause an undesirable and dangerous erratic behavior of the system. In an embedded system for air bag control, if memory errors occur in the RAM that concern the values of acceleration, the result may be faulty triggering of air bags. A faulty ROM cell, in turn, may lead, for example, to a standstill of the system.

Therefore, RAM in embedded systems is monitored during operation, these days. If errors are detected, the system is thereupon put into a secure state, and the triggering of air bags is deactivated, for example. The errors are logged for later analysis.

ROM is usually checked regularly during the switching on process of the embedded system, and also during operation. If an error is detected in the ROM, the system is also transferred to a secure state and the error is logged.

The known methods for error detection and error logging are briefly explained below.

RAM Error Detection

During initialization, each memory cell is checked. The content of the memory cell is temporarily copied into a system register and the complement (0 ↔1) of the memory content is restored. The cell is read out again and its content is compared to the complement of the content of the temporary register. If the two contents are in agreement, the storage cell is functional, otherwise it is defective. Finally, the content of the system register, that is, the original content of the cell, is restored again. This monitoring is carried out regularly during operation.

ROM Error Detection

ROM error detection is performed using check sums or CRC (cyclic redundancy check) methods. In both types of method a memory area in ROM is used for the check sum. The check sum is calculated in an external computer system, and at the first writing it is stored in the ROM together with the firmware. During operation, a check sum of the firmware is regularly calculated and compared to the stored check sum. If the check sums agree, the ROM is functional, otherwise it is flawed.

Error Logging

Error logging is carried out in a similar manner for both memory types. The content of the error protocol depends on the application. Typically, the error protocol includes the error location (RAM, ROM), the error number, a unique number being assigned to each error, the time (starting time) at which the error appeared for the first time, and perhaps the time (ending time), at which the error no longer occurred. The error protocol is stored in an additional, nonvolatile memory, such as an EEPROM. The software that executes the storing of the error protocol in the EEPROM, uses RAM and ROM regions which could themselves, in turn, be damaged. The time span that passes between the detection of an error and transition of the affected system to a secure state is relatively long, which is a disadvantage particularly in the case of safety-relevant systems, such as air bags.

In view of this state of the art, an object of the present invention is to make error detection and error logging faster and safer.

BRIEF SUMMARY OF THE INVENTION

In the example first method according to the present invention, for detecting errors in computer data in a memory, especially in a ROM, a check sum being calculated at or during the runtime, and being compared to a stored check sum, the computer data are subdivided into at least two logical blocks, and a check sum is calculated for each logical block.

The first method according to the present invention makes possible detecting errors in the memory in rapid fashion. Because of the subdivision of the computer data into logical blocks, the time required for detecting an error is reduced. In the related art, the check sum of the entire computer data first has to be calculated before an error is able to be established or detected. In the design approach according to the present invention, in the fastest case, an error is able to be detected already after calculation of the first check sum. The selection of the size of the logical blocks, and thus the number of logical blocks depends, among other things on the volume of the entire computer data, on the intended use and on the space that is available for storing the check sum. Advantageous block sizes are, for example, multiples of 8 kB, that is, 8 kB, 16 kB, 64 kB, 128 kB, etc. It is moreover of advantage that, because of the increased number of the check sums, errors can be detected which would have remained undiscovered in the case of known calculations in the related art, for instance, 2-bit errors or multiples of 2-bit errors. The calculation methods of check sums are well known, for example the above-named CRC method, and they are not explained here any further.

In one example embodiment of the first method according to the present invention, the computer data are subdivided into at least two logical blocks, a check sum is calculated for each of the logical blocks, the computer data and the calculated check sums are stored in a ROM, a first check sum of a first logical block is calculated at runtime, and the first check sum calculated at runtime is compared to a first assigned stored check sum. Advantageously, the check sums are calculated on a first calculating unit, especially on a usual computer, and then they are stored, together with the computer data, especially the firmware of an embedded system, in the ROM of a second calculating unit, especially of this embedded system. The remaining steps of the method are then advantageously executed on the second calculating unit itself.

In the first method according to the present invention, a storage error may be determined in addition if a first check sum calculated during runtime differs from a first assigned stored check sum, or the corresponding calculating steps and comparison steps for a second check sum of a second logical block and a second assigned stored check sum are repeated if the first check sums do not differ. The corresponding calculating steps and comparison steps are subsequently repeated for the check sums of possible additional logical blocks if no error has been established. A storage error can thereby be detected and established in a very simple and very rapid way.

The first method according to the present invention may be combined in a simple manner with the second method according to the present invention, by carrying out the error logging after the error detection.

According to the present invention, a first calculating unit having a processor and a memory, which has a ROM in which computer data are stored and/or a RAM, is introduced, the calculating unit carrying out specific steps of a method according to the present invention. This calculating unit can advantageously be used, especially as an embedded system, for usual known purposes, if simple and rapid error detection is desired or needed.

In the second method according to the present invention, for logging established memory errors in a ROM and/or a RAM, a logging function (memory error logging function) being executed; at least two logging functions being provided in the ROM, the type of faulty memory is established and one of the at least two logging functions is executed if the error appears in the RAM. It is determined whether one logging function is affected if the error occurs in the ROM, one of the at least two logging functions is executed if no logging function is affected, and a second logging function is executed if a first logging function is affected. Using this method, one can ensure that an error logging takes place rapidly and reliably, independent of where the error appeared, and specifically even if the error occurs in the logging function itself.

It is advantageous if, in the second method according to the present invention, a storage error is determined by an embodiment of the first method according to the present invention. In this way, the two methods may advantageously be combined, whereby both the error detection and the error logging take place more rapidly and more reliably.

It is also advantageous if, in the second method according to the present invention, the location of the storage error in the ROM is determined by an embodiment of the first method according to the present invention. Because of the calculation of the check sums of the logical blocks, it is possible to localize erroneous computer data by being able to assign them to a certain block. In the same way, during the compiling of the firmware, the situation of the logging functions can be established by special link commands. Consequently, it is possible, in a simple manner, to establish whether a logging function itself is erroneous. It is advantageous if at least one logical block is situated between the two logging functions. It should be understood that the location of the error that has occurred could be determined just as expediently using other known methods. In this context, it is especially advantageous if the processor used offers additional possibilities for error detection, such as, for instance, ECC (error correction code).

A second computing unit according to the present invention is proposed, having a processor and a memory, which has a ROM in which a firmware is stored and/or a RAM, the memory having a logging function for logging of detected or established memory errors, especially errors in the ROM and/or the RAM, at least two logging functions being provided, especially in the ROM. In this example embodiment, at least two logging functions are available. This being the case, it is possible to carry out a memory error logging even if one of the logging functions itself is erroneous. It is advantageous if the logging functions are developed in such a way that they lie completely in the ROM and also require no RAM during the execution. It is optional, for example, to use process registers for variable parameters. If different logging functions are used for RAM errors and ROM errors, the processing speed can be further increased if the type of the error (RAM, ROM) is already firmly specified in the logging function. It may be expedient to copy into the RAM a second or additional logging functions during the operation of the computer unit.

At least one logging function of the second computer unit, according to the present invention, expediently uses SPI (serial peripheral interface) for communication with an EEPROM. SPI is an interface standard for communication with an EEPROM. By the use of this standard, the magnitude of the logging function can be kept small, and the processing speed can be increased. It is understood that other communications methods can also be used, without leaving the scope of the present invention.

In one example embodiment of the design approach according to the present invention, at least two logging functions of the computer unit, according to the present invention, are equally acting.

By this one should particularly understand that they supply the same or an equivalent output in response to the same input. Consequently, when a memory error occurs, it is optional which of the logging functions to use.

It may be provided that the second computer unit according to the present invention has exactly two logging functions, the first being stored at the beginning of the storage area occupied by the firmware, and the second being stored at the end of the storage area occupied by the firmware. The use of exactly two logging functions represents a compensation between security aspects and memory requirements aspects. Because of the great spatial separation of the two logging functions it is intended to minimize the probability of simultaneous damage to both logging functions. For instance, because of shortcomings during manufacturing, larger contiguous memory regions could become defective.

In one example embodiment, the second computer unit according to the present invention carries out the steps of the second method according to the present invention.

It may be provided that the one computer unit according to the present invention is used in a motor vehicle, especially as a control unit or an embedded system. It is expediently available to be able to control safety-relevant vehicle functions such as air bags, antilock systems electronic lane stabilization, electronic traction control, etc.

The common inventive thought on which the error detection method and the error logging function and the corresponding computer units are based is the multiplication of the calculating means, namely of the check sum calculation and the logging function, in order to obtain a result more rapidly and more certainly.

A computer program according to the present invention includes program code means for carrying out one of the methods according to the present invention, if the computer program is executed on a computer or an equivalent calculating unit, especially one of the computer units according to the present invention.

A computer program product according to the present invention includes program code means that are stored on a computer-readable data carrier, in order to carry out one of the methods according to the present invention, if the computer program product is executed on a computer or on an equivalent computer unit, especially one of the computer units according to the present invention. Suitable data carriers are, particularly, diskettes, hard disks, flash memories, EEPROM's, CD ROMS, and others. Downloading a programs via computer networks (Internet, Intranet, etc.) is also possible.

It is understood that the aforementioned features and the features yet to be explained below may be used not only in the combination indicated in each instance, but also in other combinations or by themselves, without departing from the scope of the present invention.

DETAILED DESCRIPTION OF THE INVENTION

Figure 1A:
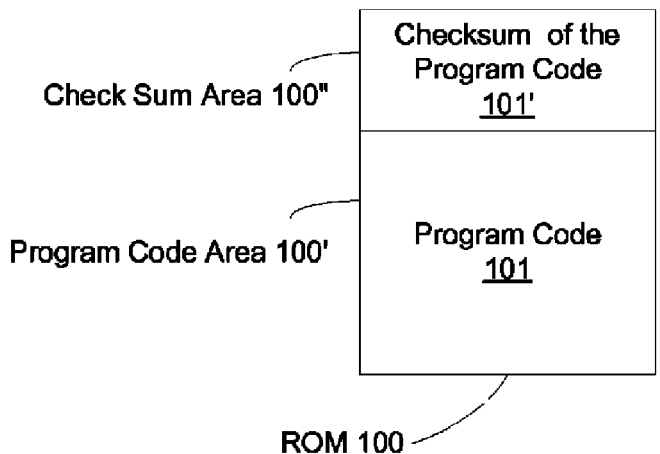
FIG. 1a shows a schematic representation of a conventional check sum calculation.

In FIG. 1a, a schematic representation of a ROM is designated overall by 100. ROM 100 has an area 100', in which a program code 101 is typically stored. Program code 101 is required for operating the respective computer unit, for instance, of an embedded system or of a control unit in a motor vehicle, and specifies the functionality. Program code 101 is generally denoted as firmware. The development and the design of the firmware usually takes place on computers. That is where firmware is created, tested and finally compiled. The compiled version represents program code 101 that is executable on the computer unit, which is then transmitted to ROM 100 of the computer unit and which represents the area 100' in question.

In the related art, this compiled program code 101 calculates a check sum 101', using known methods. The program code itself also includes functions for calculating check sums. In writing on and programming the ROM, compiled program code 101 and appertaining check sum 101' are finally stored in ROM 100. The area inside ROM 100, that is occupied by check sum 101', is designated as 100".

While the computer unit is in operation, a check sum of program code 101 is calculated and compared to stored check sum 101'. If these check sums do not agree, a storage error in the ROM can be established. The time span required for establishing an error thus includes at least the time that is necessary to calculate a check sum of the entire program code 101.

Figure 1B:
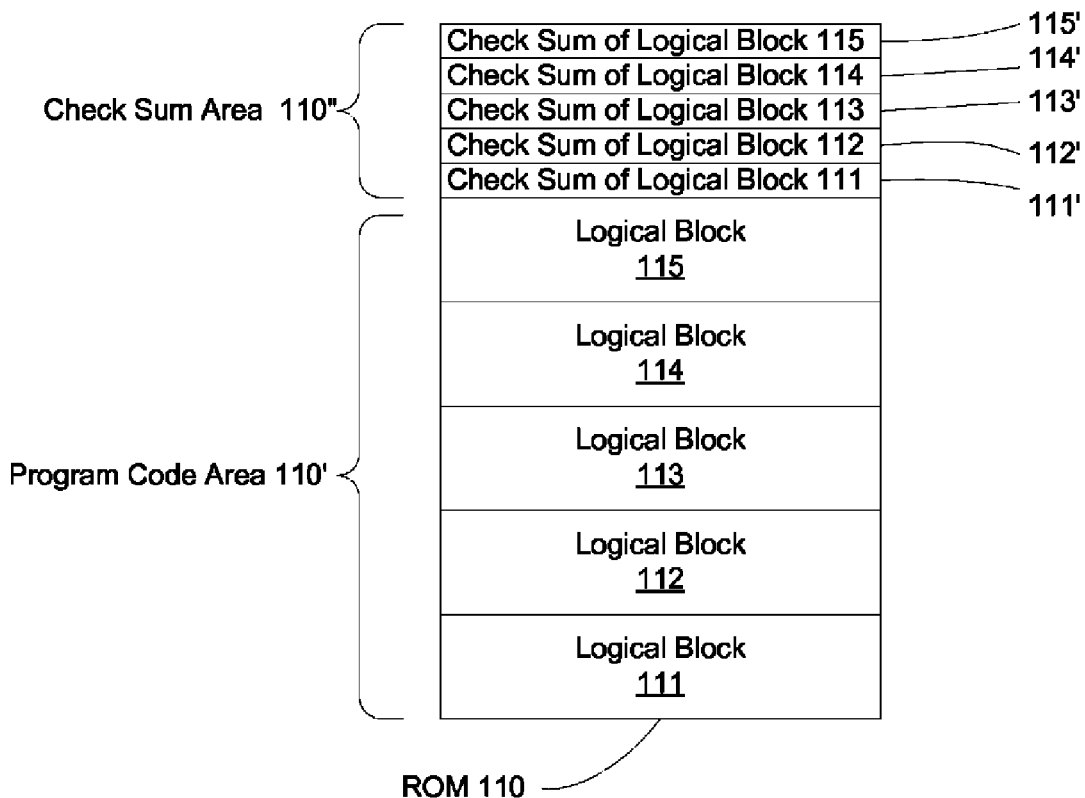
FIG. 1b shows a schematic representation of a ROM 110, which has two areas 110' and 110". The area which includes program code or firmware is designated as area 110', and the area which includes check sums is designated as area 110".

FIG. 1b shows a schematic representation of a ROM 100, which has two areas 110' and 110". The area which includes program code or firmware is designated as area 110', and the area which includes check sums is designated as area 110".

As was described in connection with FIG. 1a, a program code is created and compiled. The program code is then subdivided into five logical blocks 111 to 115. The number of blocks as well as their size is in principle freely selectable by the user, according to his requirements. Using known methods, a check sum 111' to 115' is calculated for each logical block 111 to 115. The program code itself, in turn, includes functions for calculating a check sum during runtime.

When writing to the ROM, compiled program code that is subdivided into logical blocks 111 to 115 is stored in area 110', and calculated check sums 111' to 115' is stored in area 110". It should be mentioned that both logical blocks 111 to 115 and the two areas 110' and 110" do not have to represent any physical subdivisions of the ROM. Typically, purely fictitious subdivisions are involved.

While the computer unit is in operation, a check sum of a logical block 111 to 115 of the program code is calculated cyclically and in sequence and is compared to the appertaining stored check sum 111' to 115'. If these appertaining check sums do not agree, a storage error in the ROM can be established. The time span required for establishing an error advantageously amounts only to at least the time that is necessary to calculate a check sum of a single logical block 111, . . . , 115.

In the combination of the example embodiment of the first method according to the present invention, presented in light of FIG. 1b, and an example embodiment of the second method according to the present invention, or the second computer unit according to the present invention, a first logging function would, for instance, be stored in the area of logical block 111 and a second logging function would, for instance, be stored in the area of logical block 115.

Figure 2:
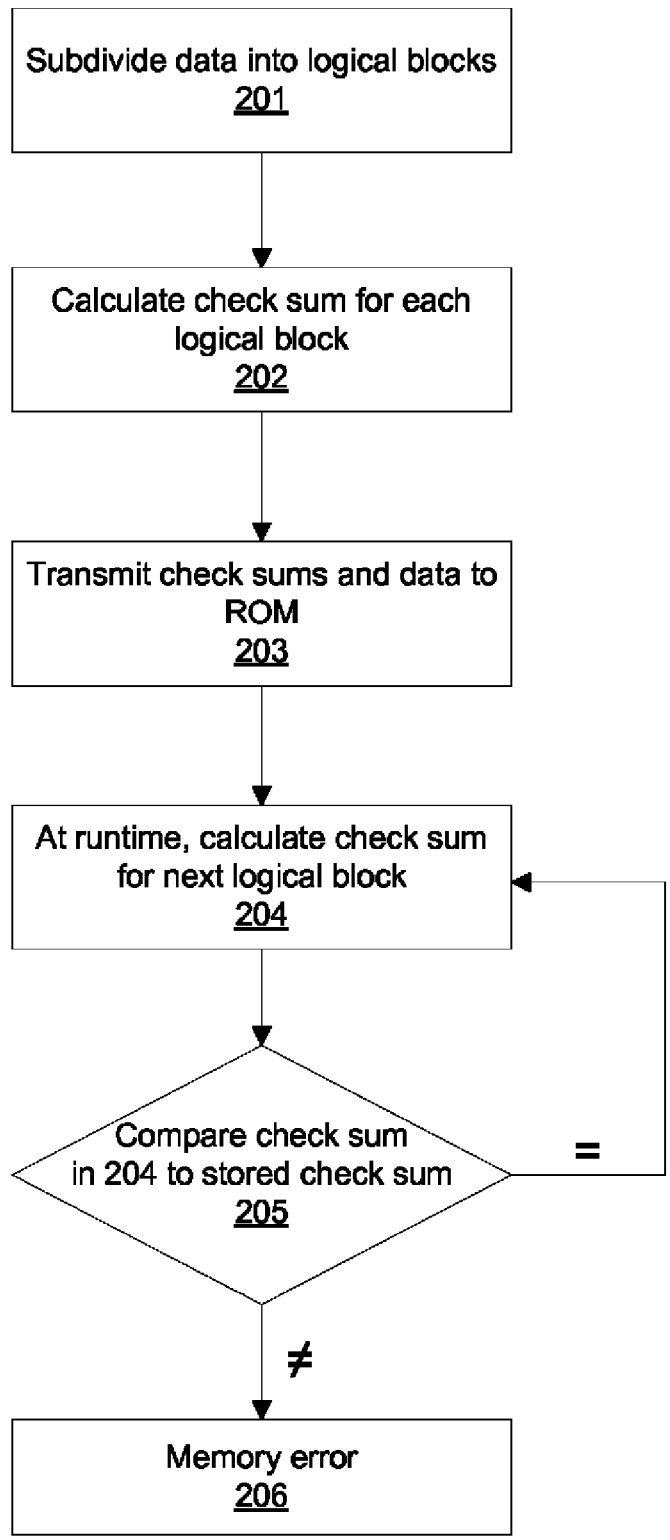
FIG. 2 shows a flow chart of an example embodiment of the first method according to the present invention.

FIG. 2 shows the steps of an example embodiment of the first method according to the present invention. In step 201, computer data, that were typically compiled on a PC, are subdivided into logical blocks. In step 202 a check sum is then calculated of each of these logical blocks. Subsequently, the computer data and the calculated check sums are transmitted into a ROM of a computer unit in step 203.

In step 204, at runtime, a first check sum is calculated of a first logical block. The calculated check sum is compared in step 205 to the associated or appertaining check sum that is already stored in the ROM. If these check sums agree, one may assume that no memory error is present within the logical blocks observed. Then, step 204 is carried out again, a next logical block being observed.

On the other hand, if in step 205 a difference between the appertaining check sums is established, method step 206 is carried out. At this point, the observed logical block is classified as erroneous, and a memory error is established.

Figure 3:
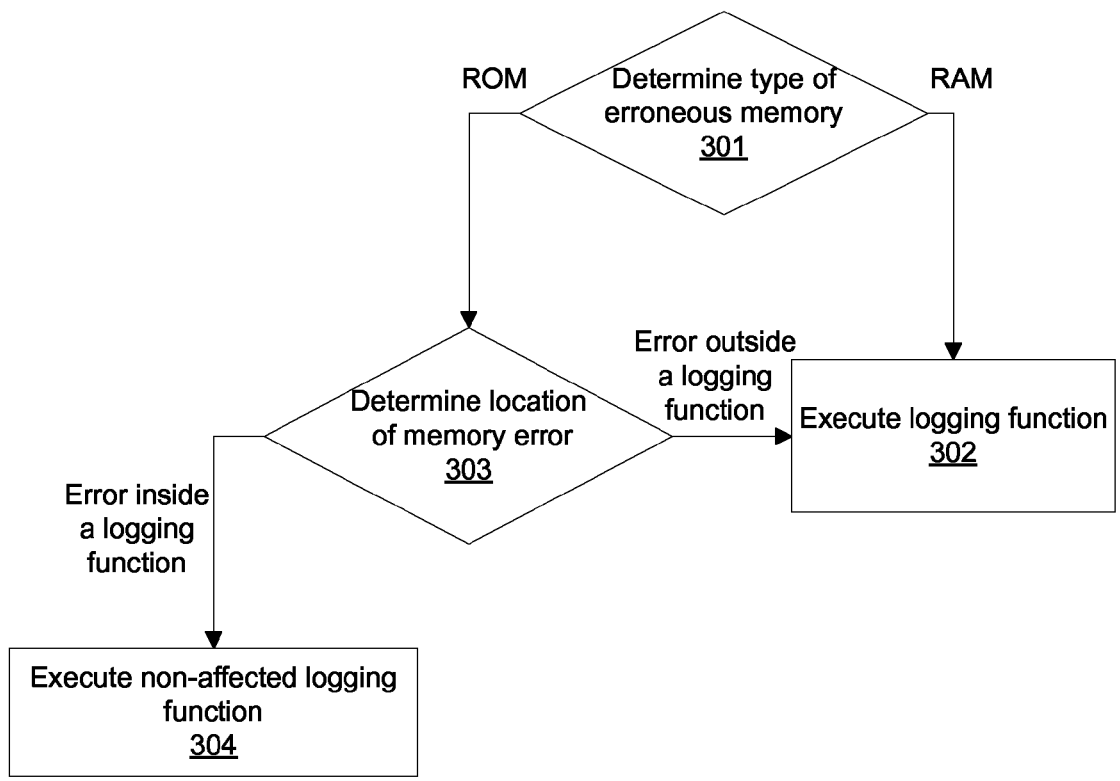
FIG. 3 shows a flow chart of an example embodiment of the second method according to the present invention.

In FIG. 3, the method steps of an example embodiment of the second method according to the present invention are designated by 301 to 304. It may be provided that method step 301 is carried out after method step 206 of FIG. 2.

In step 301, the type of the erroneous memory is determined. In the process, in the specific embodiment described, a distinction is made between RAM and ROM. If it is established that the memory in question is a RAM, then method step 302 takes place. If the memory in question is a ROM, the method continues with step 303.

In step 302, an optional logging function is executed. Since the error has occurred in the RAM, no logging function is erroneous, so that the first logging function that is present is executed.

However, if the erroneous memory location is in the ROM, no logging function itself can be affected. Therefore, in step 303 it is established where the memory error is located. If it lies outside a logging function, the system continues with step 302, and an optional logging function is executed.

However, if the memory error is inside a logging function, the other, not affected logging function is executed in method step 304. It is also advantageous, for example, only to check whether a first logging function that is to be executed in standard fashion is affected, and to carry out a second logging function only if the first one is affected.

What is claimed is:

1. A method for logging memory errors occurring in a computer memory, wherein at least two memory-error logging functions are stored in the memory, the method comprising:
   a) if a memory error is detected, determining what type of memory is involved in connection with the error;
   b) if the error occurs in a random-access memory, executing one of the at least two memory-error logging functions;
   c) if the error occurs in a read-only memory, determining whether at least one of the at least two memory-error logging functions is affected by the error;
   d) if no memory-error logging function is affected by the error, executing one of the at least two memory-error logging functions; and
   e) if a first one of the at least two memory-error logging functions is affected by the error, executing a second one of the at least two memory-error logging functions.

2. The method as recited in claim 1, wherein a memory error is detected by a method including the steps of:
   subdividing the computer data into at least two logical blocks;
   calculating a reference check sum for each of the at least two logical blocks;
   storing the computer data and the calculated reference check sums in the memory;
   calculating a check sum for a first one of the at least two logical blocks in runtime; and
   comparing the calculated runtime check sum for the first one of the at least two logical blocks to a stored reference check sum for the first one of the at least two logical blocks.

3. The method as recited in claim 2, wherein the location of the memory error in the read-only memory is determined as part of the method step c) for determining whether at least one of the at least two memory-error logging functions is affected by the error.

4. A computer unit, comprising:
   a processor; and
   a memory unit including a read-only memory storing a firmware, wherein the memory stores at least two memory-error logging functions for logging detected memory errors;
   wherein a first one of the error logging functions operates to log a detected memory error, and a second one of the error logging functions operates as a redundant backup in response to a determination by the processor that the detected memory error affects the first error logging function.

5. The computer unit as recited in claim 4, wherein at least one of the two memory-error logging functions communicates with an EEPROM via a serial-peripheral interface.

6. The computer unit as recited in one of claim 4, wherein a first one of the at least two memory-error logging functions is stored at the beginning of a memory area occupied by the firmware, and wherein a second one of the at least two memory-error logging functions is stored at the end of the memory area occupied by firmware.

7. The computer unit as recited in claim 4, wherein the computer unit executes a method for logging memory errors occurring in the memory unit, the method comprising:
   a) if a memory error is detected, determining what type of memory is involved in connection with the error;
   b) if the error occurs in a random-access memory, executing one of the at least two memory-error logging functions;
   c) if the error occurs in a read-only memory, determining whether at least one of the at least two memory-error logging functions is affected by the error;
   d) if no memory-error logging function is affected by the error, executing one of the at least two memory-error logging functions; and
   e) if a first one of the at least two memory-error logging functions is affected by the error, executing a second one of the at least two memory-error logging functions.

8. The computer unit as recited in claim 7, wherein the computer unit is a control unit in a motor vehicle.

9. A computer-readable storage medium storing program codes for carrying out the steps of a method for logging memory errors occurring in a computer memory, wherein at least two memory-error logging functions are stored in the computer memory, the method comprising:
   a) if a memory error is detected, determining what type of memory is involved in connection with the error;
   b) if the error occurs in a random-access memory, executing one of the at least two memory-error logging functions;
   c) if the error occurs in a read-only memory, determining whether at least one of the at least two memory-error logging functions is affected by the error;
   d) if no memory-error logging function is affected by the error, executing one of the at least two memory-error logging functions; and
   e) if a first one of the at least two memory-error logging functions is affected by the error, executing a second one of the at least two memory-error logging functions.

10. A computer unit, comprising:
    a processor; and
    a memory unit including a read-only memory storing a firmware, wherein the memory stores at least two memory-error logging functions for logging detected memory errors; and
    wherein the computer unit executes a method for logging memory errors occurring in the memory unit, the method comprising:
    a) if a memory error is detected, determining what type of memory is involved in connection with the error;
    b) if the error occurs in a random-access memory, executing one of the at least two memory-error logging functions;
    c) if the error occurs in a read-only memory, determining whether at least one of the at least two memory-error logging functions is affected by the error;
    d) if no memory-error logging function is affected by the error, executing one of the at least two memory-error logging functions; and e) if a first one of the at least two memory-error logging functions is affected by the error, executing a second one of the at least two memory-error logging functions.

11. The computer unit as recited in claim 10, wherein the computer unit is a control unit in a motor vehicle.

* * * * *